(12) United States Patent
Crawford

(10) Patent No.: US 6,205,749 B1
(45) Date of Patent: Mar. 27, 2001

(54) FOODSTUFF COLLATING SYSTEM AND METHOD

(75) Inventor: Paul Crawford, 53 Scripps Landing N.W., Calgary, Alberta (CA), T3L 1W1

(73) Assignee: Paul Crawford, Calgary (CA)

( * ) Notice: Subject to any disclaimer, the term of this patent is extended or adjusted under 35 U.S.C. 154(b) by 0 days.

(21) Appl. No.: 09/341,560
(22) PCT Filed: Dec. 12, 1997
(86) PCT No.: PCT/CA97/00965
§ 371 Date: Jul. 14, 1999
§ 102(e) Date: Jul. 14, 1999
(87) PCT Pub. No.: WO98/31618
PCT Pub. Date: Jul. 23, 1998

Related U.S. Application Data

(60) Provisional application No. 60/036,113, filed on Jan. 15, 1997.

(51) Int. Cl.[7] .............................. B65B 35/56; B65G 47/12
(52) U.S. Cl. ................................ 53/446; 53/147; 53/448; 53/544; 53/547; 198/383; 198/443; 198/446
(58) Field of Search .............................. 53/446, 544, 542, 53/147, 448, 154; 198/528, 550.4, 560, 562, 382, 383, 445, 446, 432, 443

(56) References Cited

U.S. PATENT DOCUMENTS

| 2,775,334 | * | 12/1956 | Jeremiah | 198/383 |
| 3,301,378 | * | 1/1967 | Wayne et al. | 198/383 |
| 3,469,672 | * | 9/1969 | Stutske et al. | 198/446 |
| 3,528,213 | * | 9/1970 | Mottweiler | 198/432 |
| 3,752,293 | * | 8/1973 | Fort | 198/383 |
| 4,146,123 | * | 3/1979 | Cottrell | 198/382 |
| 4,163,487 | * | 8/1979 | Dupuis | 198/383 |
| 4,339,027 | * | 7/1982 | Lauer | 198/383 |
| 4,953,343 | * | 9/1990 | Hellman | 53/544 |
| 6,006,890 | * | 12/1999 | Crawford | 198/443 |

* cited by examiner

*Primary Examiner*—Peter Vo
*Assistant Examiner*—Louis Huynh
(74) *Attorney, Agent, or Firm*—Paul S. Sharpe; Marks & Clerk

(57) ABSTRACT

A foodstuff collating apparatus having a plurality of discrete channels within which foodstuffs are collated. The apparatus is elevated at one end to provide a slide for the foodstuff with the channels converging from one end of the apparatus to the other. As the foodstuff slides down a channel, the former is oriented from a random position to an ordered vertical disposition.

2 Claims, 3 Drawing Sheets

FOODSTUFF COLLATING SYSTEM AND METHOD

This application claims benefit to Provisional No. 60/036,113, filed Jan. 15, 1997 and is a 371 of PCT/CA97/00965, filed Dec. 12, 1997.

TECHNICAL FIELD

The present invention relates to collating apparatus for collating loose articles and more particularly, the present invention relates to an apparatus for arranging and/or collating articles into a neat orderly array and a method of employing the apparatus.

BACKGROUND ART

Many different forms of collating arrangements are known in the art and one of the chief drawbacks of those existing arrangements is realized with the degree of labour intensity. Generally speaking, several personnel are involved in handling the articles to eventually be packaged and this often leads to difficulties in terms of damaged goods as well as complications with respect to health standards. Further limitations revolve around the fact that the additional personnel add labour costs to the overall process.

It would be desirable if there were a method for collating loose articles into an orderly array which is significantly less labour intensive and which reduces the contact between the product and the personnel packaging the product.

The present invention is directed to solving the difficulties as set forth herein.

INDUSTRIAL APPLICABILITY

The present invention has utility in the food handling art.

DISCLOSURE OF THE INVENTION

One object of the present invention is to provide an improved method and apparatus for collating loose articles into an orderly array.

A further object of the present invention is to provide an apparatus for orienting articles having edges and generally rounded opposed ends, comprising:

a plurality of continuous channels for slidably transporting the articles, each channel having a receiving end for receiving the articles and a discharge end for discharging the articles, each channel having a width dimension, a diagonal wall, an opposed wall and a top edge, each channel having a generally sawtooth configuration adjacent the receiving end with the width dimension progressively decreasing from the receiving end to the discharge end, each channel having substantially vertical and parallel walls adjacent the discharge end and reduced width relative to the receiving end, the receiving end being at a higher elevation than the discharge end; and repositioning means at the top edge of each channel for repositioning an article contacting the edge into a respective channel, whereby when the articles are received in a relatively random form at the receiving end and are slidably transported under gravity to the discharge end, the channels and the repositioning means orient the articles from a relatively disordered form with respect to one another to an ordered collated array with respect to one another.

Any number of channels may be employed in the arrangement and this will depend upon the volume of article to be packaged among other factors. The channel may be formed of any suitable material having a low coefficient of friction in order to ensure quick transportation of the product from the receiving end of the apparatus to a discharge end. To this end, the receiving end will be elevated relative to the discharge end in order to provide a "ramp effect" and thus facilitate sliding of the article down the channel. Suitable materials for construction of the channels include aluminum, Teflon™ suitable plastics or other suitable metals acceptable to the food industry and also providing the necessary degree of friction. As a further feature, the temperature of the channels may be controlled (heated, cooled) depending upon the type of product to be collated.

A further object of the present invention is to provide an apparatus for sorting and packaging articles, comprising, in combination:

conveyor means for conveying the articles;

a plurality of continuous channels for slidably transporting the articles, each channel having a receiving end for receiving the articles and a discharge end for discharging the articles, each channel having a width dimension, a diagonal wall, an opposed wall and a top edge, each channel having a generally sawtooth configuration adjacent the receiving end with the width dimension progressively decreasing from the receiving end to the discharge end, each channel having substantially vertical and parallel walls adjacent the discharge end and reduced width relative to the receiving end, the receiving end being at a higher elevation than the discharge end;

repositioning means at the top edge of each channel for repositioning an article contacting the edge into a respective channel; and packaging means for packaging an array of oriented articles.

The channels may include pegs, cams or some additional element on the top edges in order to reposition, for example, a potato patty from a generally horizontal position relative to the channel to a position where the patty is vertically oriented within the channel. This may also be achieved by providing a texture on the top edge of the channels or simply having different material on adjacent top edges to provide a different coefficient of friction. This will ensure that any randomness in the orientation of the product is eliminated by the edging to reposition the article. In this manner, the channels provide a self-aligning feature for the articles contacting them.

A further object of the present invention is to provide a method of collating loose articles from a relatively disordered state, comprising the steps of:

providing a plurality of channels for slidably receiving the articles, the channels tapering in width from a receiving end to a discharge end and having a substantially sawtooth configuration adjacent the receiving end and a parallel vertical wall configuration adjacent the discharge end, the receiving end being elevated relative to the discharge end, the channels being continuous and uninterrupted between the receiving end and the discharge end;

introducing the articles at the receiving end at any orientation relative to the channels;

sliding the articles, by gravity, down a respective channel to progressively collate the articles at the discharge end; and discharging the articles in an ordered collated array.

Having thus described the invention, reference will now be made to the accompanying drawings illustrating preferred embodiments.

BRIEF DESCRIPTION OF THE DRAWINGS

Similar numerals in the figures denote similar elements.

MODES FOR CARRYING OUT THE INVENTION

Figure 1:
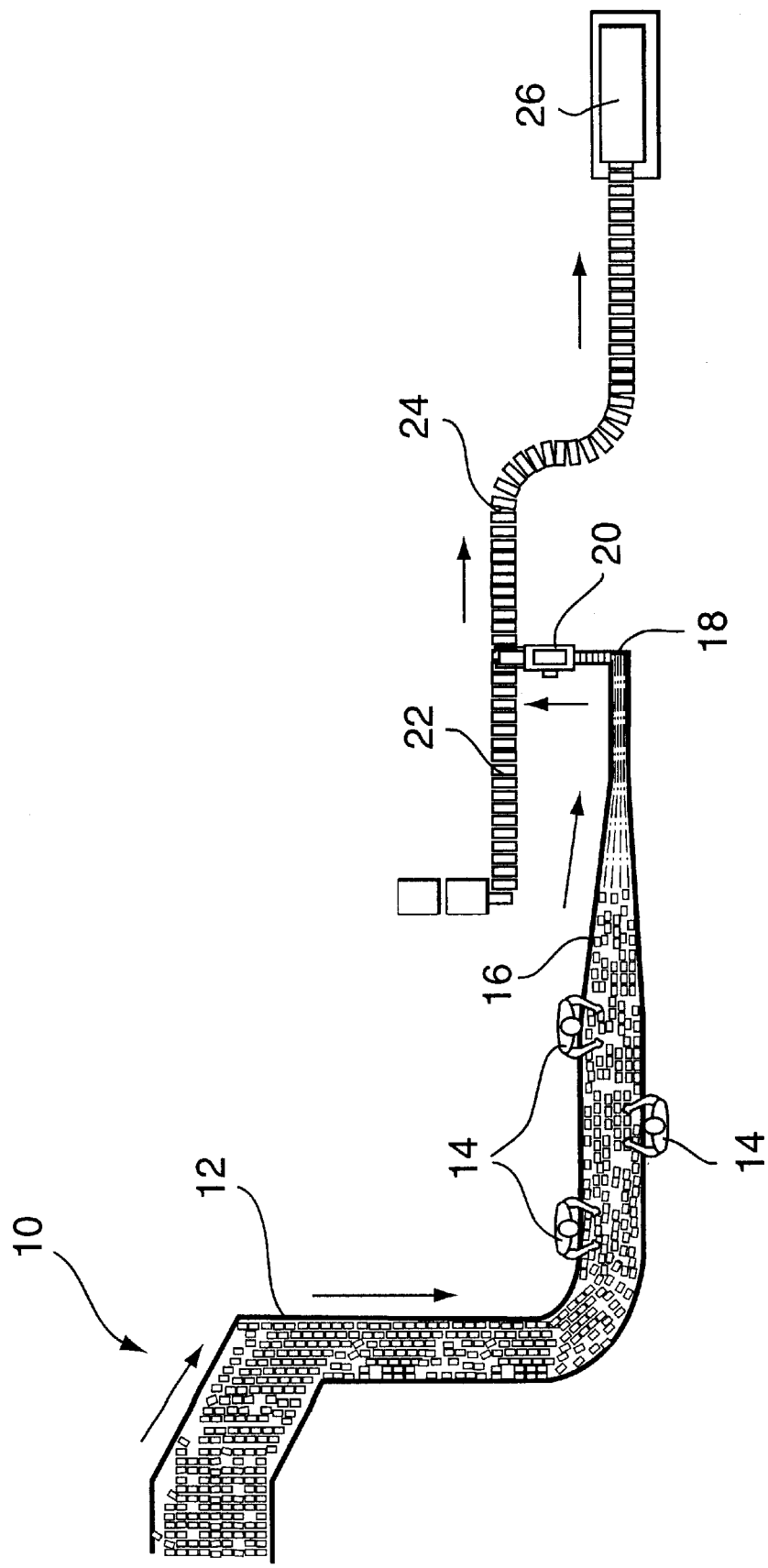
FIG. 1 is an overall schematic illustration depicting a sorting, collecting and packaging procedure.

Referring now to the drawings, FIG. 1 broadly illustrates a sorting, collecting and packaging system in schematic form.

The articles, in this example, patties, may be ovular or rectangular, are typically discharged into a freeze tunnel conveyor from previous processing operations (not shown). The freeze tunnel is broadly denoted by numeral 10. From the freeze tunnel 10, the articles are passed on to a dispensing conveyor 12 which orients the patties from travelling widthwise to a lengthwise arrangement. Inspectors 14, in the conveyor line 12, typically examine the patties for quality assurance purposes and remove any broken or otherwise inferior patties. The patties are then passed on to the collating apparatus, broadly denoted by numeral 16 to be discussed hereinafter in much greater detail. From the collating apparatus 16, the patties are then conveyed via conveyor 18 to a packaging machine 20, which receives trays 22 in timed sequence in order to charge a tray 22 with patties. The charged trays 24 are then passed on to, for example, a shrink wrap machine 26. Having thus generally described the overall process sequence, reference will now be made in greater detail to the collating apparatus 16 shown best in FIGS. 2, 3, and 4.

Figure 2:
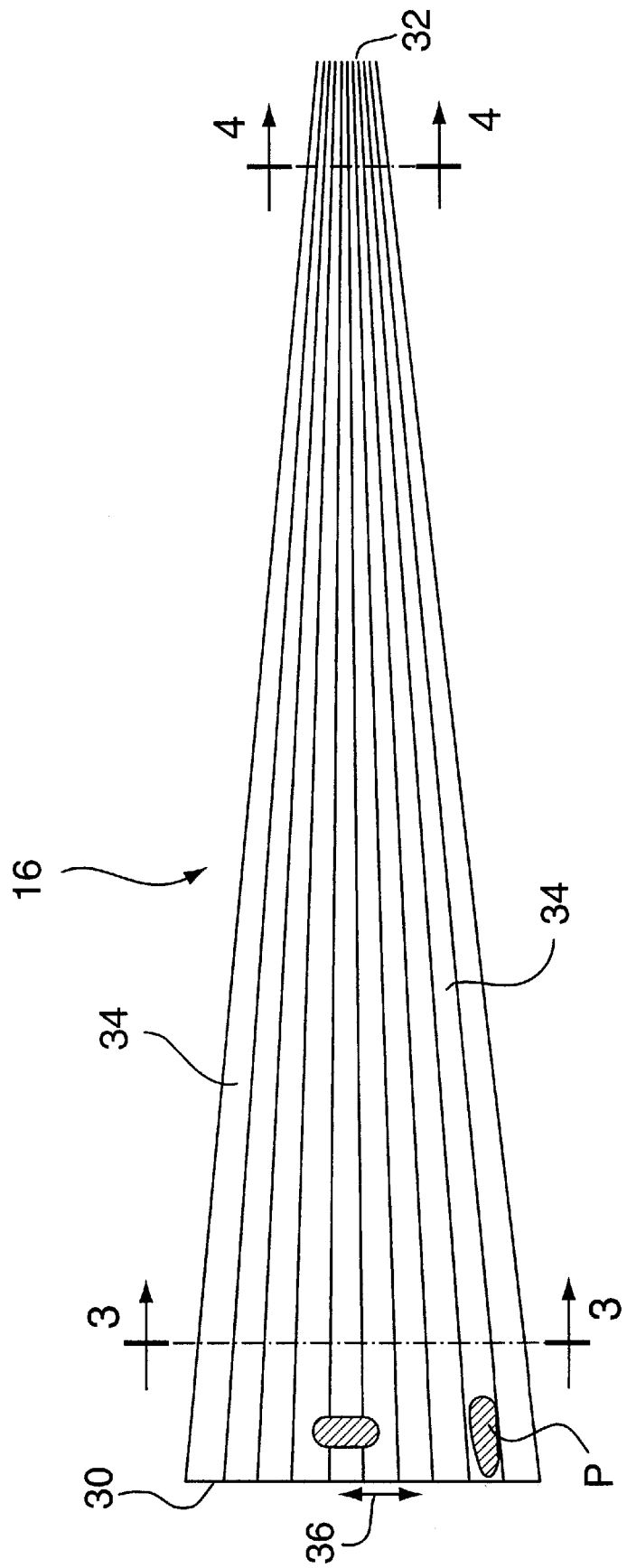
FIG. 2 is a top plan view of the apparatus according to one embodiment.

FIG. 2 illustrates a top plan view of the collating apparatus 16 with parts removed for clarity. As is illustrated, the collating apparatus includes a receiving end 30 and a discharge end opposed therefrom and denoted by numeral 32. The collating apparatus 16 includes a plurality of discrete channels 34 regularly spaced from one another and extending from the receiving end 30 to the discharge end 32. Channels 34 each have a width dimension broadly denoted by numeral 36 in FIG. 2, which width dimension progressively decreases from the receiving end 30 to the discharge end 32 such that the overall apparatus 16 converges from the receiving end to the discharge end. In this convergent pattern, the width dimension within any channel remains constant relative to an adjacent channel.

Figure 3:
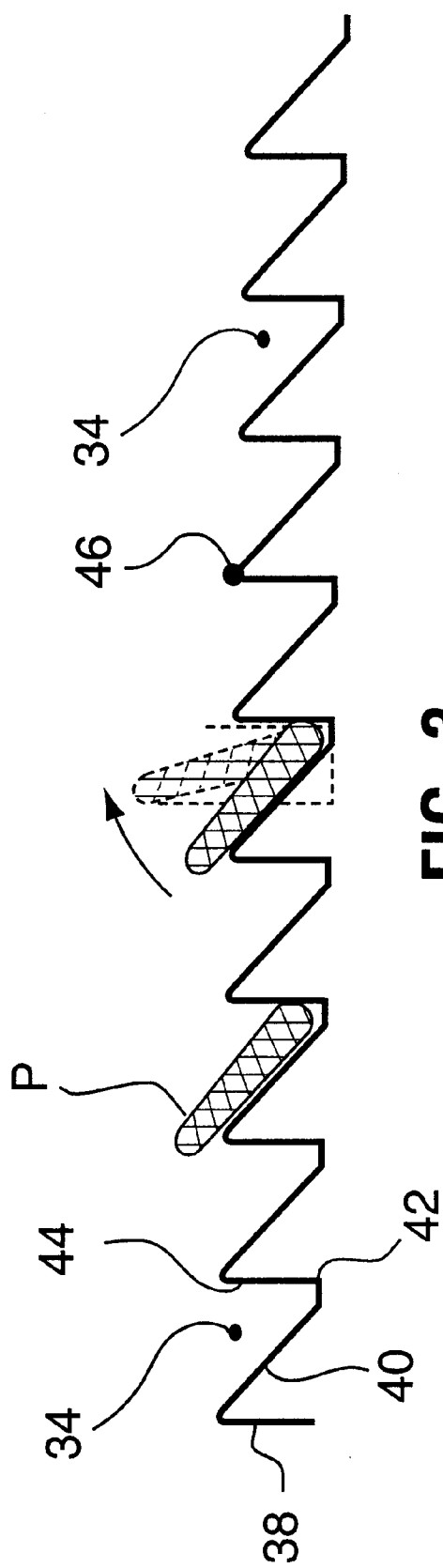
FIG. 3 is a sectional view along line 3—3 of FIG. 2.

FIG. 3 illustrates a section along line 3—3 of FIG. 2 which depicts the channels 34 in a generally sawtooth formation. As is illustrated, each channel includes a first substantially vertical wall 38 and a diagonally oriented wall 40, the orientation being relative to the vertical wall 38. Diagonal wall 40 terminates in a substantially horizontal base wall segment 42 and further includes a second vertical wall 44, which is at approximately 90° relative to partial wall 42 and in a parallel and spaced relationship with wall 38. In this manner, at least at the receiving end and somewhat spaced therefrom, the channels start with a straight wall 38/44 and an inclined wall 40. The spacing between the channels 34 is less than the length of the patty P, but greater than the width of the patty P.

Figure 4:
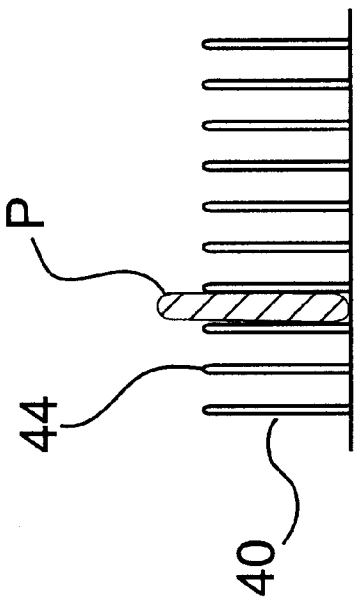
FIG. 4 is a section along line 4—4 of FIG. 2.

Generally proximate end 32, the inclined wall 40 in each channel 34 is substantially vertical. This is illustrated in FIG. 4. The transition from an angular wall 40 to its substantially vertical orientation is progressive along the length of channel 16 as is illustrated in FIG. 2. In this manner, the patty P moves along the collating apparatus 16, it is moved from a generally inclined form to a vertically oriented disposition. This facilitates arranging the patty P into an orderly array at end 32 for subsequent charging into a tray 22 as broadly illustrated in FIG. 1.

In order to achieve this, the collating apparatus 16 and more particularly, the end 30, is elevated somewhat relative to end 32. The elevation may be from about 20° to about 40° or greater relative to the horizontal. By providing the elevation, this facilitates sliding of the patties P down the channels from end 30 to 32.

In operation, the patties P generally enter the receiving end of the apparatus 16 at the various orientations relative to one another. This is typically random and is illustrated in FIG. 2 where one patty is between channels 34 whereas the other is disposed in a cross channel form. By providing the arrangement of the channels 34 as illustrated in FIG. 3, this random disposition is solved simply by having the patty P fall into the channel 34. It is then automatically turned on its side by virtue of the configuration of the channel 34 as it travels down the inclined apparatus 16. In order to ensure that the cross channel patties positively are oriented on a side such as that shown in FIG. 3, small pegs 46 may be employed at the crest or the juncture of walls 38 and 40. By providing pegs 46, if the article is cross channel or riding the crests, the pegs ensure reorientation or repositioning to the form shown in FIG. 3, i.e. the patty is on an edge within the channel 34.

It is clearly envisioned in the absence of pegs 46, the top edges of channels 34 may be composed of materials having different coefficients in order to induce the proper disposition of the patty P into the channel 34. Other forms of locating may be employed such as means for vibrating the channels 34, cammed internal surfaces inter alia.

FIG. 3 shows in chain line, the gradual change in attitude of the patty P as the same travels the course of the channel 34.

The present invention thus alleviates the need superfluous personnel in the packaging procedure and further avoids excessive handling by personnel of the product to be packaged.

It will be appreciated by those skilled that although potato patties have been indicated to be the article, the apparatus and methodology are amenable to any article that may be packaged.

Although embodiments of the invention have been described above, it is not limited thereto and it will be apparent to those skilled in the art that numerous modifications form part of the present invention insofar as they do not depart from the spirit, nature and scope of the claimed and described invention.

What is claimed is:

1. A method of collating loose articles from a relatively disordered state, comprising the steps of:

providing a plurality of channels for slidably receiving said articles, said channels tapering in width from a receiving end to a discharge end, said channels having a substantially sawtooth configuration adjacent said receiving end and a parallel vertical wall configuration adjacent said discharge end, said receiving end being elevated relative to said discharge end, said channels being continuous and uninterrupted between said receiving end and said discharge end;

introducing said articles at said receiving end at any orientation relative to said channels;

sliding said articles, by gravity, down a respective channel;

progressively changing the attitude of said articles from a generally horizontal attitude to a substantially vertical attitude at said discharge end;

collating said articles at said discharge end; and discharging said articles in an ordered collated array.

2. The apparatus as characterized in claim 1, further including the step of packaging said articles.

* * * * *